United States Patent [19]

Hermans

[11] 4,072,633
[45] Feb. 7, 1978

[54] NOVEL PROCESS

[75] Inventor: Johny C. Hermans, Wespelaar, Belgium

[73] Assignee: S.A. Texaco Belgium N.V., Brussels, Belgium

[21] Appl. No.: 628,286

[22] Filed: Nov. 3, 1975

[30] Foreign Application Priority Data
May 21, 1975 United Kingdom ............... 21795/75
May 21, 1975 United Kingdom ............... 21796/75

[51] Int. Cl.$^2$ ............................................. C08G 59/50
[52] U.S. Cl. .................................. 260/2 N; 260/2 EP; 260/47 EP; 260/47 EN; 260/268 K
[58] Field of Search ............ 260/47 EN, 47 EP, 2 N, 260/2 EP, 268 K

[56] References Cited

U.S. PATENT DOCUMENTS

| | | |
|---|---|---|
| 3,036,076 | 5/1962 | Gabler et al. ......................... 260/268 |
| 3,516,965 | 6/1970 | Washburn ............................. 260/47 |
| 3,755,323 | 8/1973 | Weil et al. .......................... 260/249.6 |

Primary Examiner—Harold D. Anderson
Assistant Examiner—E. A. Nielsen
Attorney, Agent, or Firm—Thomas H. Whaley; Carl G. Ries; Carl G. Seutter

[57] ABSTRACT

Polymers, particularly useful as flame-proofing agents, are prepared by the reaction of a bis-epoxide with a phosphorus-containing bispiperazide.

17 Claims, No Drawings

NOVEL PROCESS

FIELD OF THE INVENTION

This invention relates to novel polymers and to a process for the preparation thereof. These polymers are the reaction products of bis-epoxides and phosphoric or thiophosphoric acid bispiperazides and tris-piperazides.

BACKGROUND OF THE INVENTION

It is known that polymers can be obtained by reacting bis epoxides with diamines. The polymers are curable by cross-linking to form solid resins which are useful as impregnating agents, glues, and moulding compositions. A continual search is going on for resins of this general type with improved and advantageous properties.

There have also, in the past, been efforts at preparing polyphosphates and polyphosphoramidates from bis-epoxy compounds: see U.S. Pat. Nos. 2,732,367; 2,826,592 and 2,856,369, and Sander & Steininger: "Reviews in Macromolecular Chemistry", Vol. 3 (1968), pp. 11–13. There has not, however, as far as is known, been any production of polymers from epoxides and phosphorus-containing bispiperazides.

The object of the present invention is to provide novel epoxy resins. Another object of the invention is to provide epoxy resins having non-flammable and flame-retardant properties.

STATEMENT OF THE INVENTION

The present invention provides polymers containing units of the formula

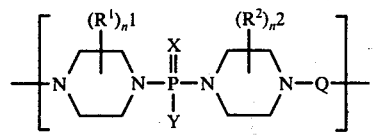

wherein
X represents an oxygen or sulphur atom, or a group of the formula $>N-R$ in which R represents an aliphatic, cycloaliphatic or aromatic group or a heterocyclic group, or it may be absent;
Y represents an aliphatic, cycloaliphatic or aromatic hydrocarbon group, or a heterocyclic group; a group of the formula $-NHR$ or $-NR_2$ in which R has the meaning given above, or in which the two groups R and the nitrogen atom to which they are attached represent a N-containing heterocyclic group; a group of the formula $-OR$ in which R has the meaning given above; or a group of the formula

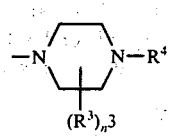

$R^1$, $R^2$, $R^3$ and $R^4$ each represents a substituent on a piperazine ring;
$n^1$, $n^2$ and $n^3$ each represents 0 or an integer; and
Q represents the residue of a symmetrical or unsymmetrical bis-epoxide.

DESCRIPTION OF THE INVENTION

The present invention provides a process for the production of a polymer as described above which comprises reacting a bis-epoxide, e.g. a bisepoxide of the formula

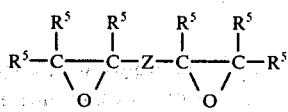

in which Z represents a direct single bond or an organic radical, and the various symbols $R^5$, which can have the same or different meanings, each represents hydrogen or a substituted or unsubstituted aliphatic, cycloaliphatic or aromatic group, or two groups $R^5$, not attached to the same carbon atom, can together with the respective carbon atoms to which they are attached, represent a substituted or unsubstituted cycloaliphatic group, any substituents on the groups $R^5$ being inert with respect to epoxy groups, most preferably a bis-epoxide of the formula

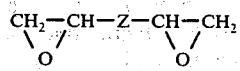

with a diamine of the formula

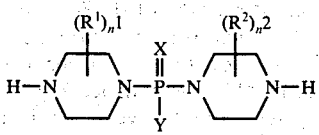

in which formulae $R^1$, $R^2$, $n^1$, $n^2$, X, Y and Z have the meanings given above.

The bis-epoxide, e.g. of general formula III, may be a single compound or a mixture of two or more bis-epoxides may be employed. Similarly, a single diamine of formula V, or a mixture of such amines can be employed. Moreover, the diamine V can be employed in conjunction with other diamines, whereby the resulting polymers contain some units of formula I and other units wherein the diamino moiety is derived from another organic diamine.

The polymers of formula I contain free hydroxy groups and can be cross-linked by reactions involving such groups. For instance the polymers can be reacted with further bis-epoxides, or with bis-anhydrides or diisocyanates.

It is also possible to use the free hydroxyl groups to adapt the properties of the polymers. For instance, they can be blocked with monofunctional reagents such as acid chlorides (e.g. acetyl chloride), anhydrides (e.g. acetic anhydride) or monoisocyanates (e.g. phenyl isocyanate). Such reactions can also be used to link chromophoric groups to the chain, thereby forming coloured polymers.

In the present invention the symbol X can represent an oxygen or sulphur atom or a group of the formula = NR, or it can be absent. The diamines of formula W are therefore amides of phosphoric acid (when X represents oxygen); thiophosphoric acid (when X represents sulphur); phosphoramidic acid (when X represents = NR); and phosphorous acid (when X is absent).

The symbol Y can represent a group of the formula:

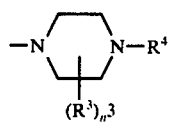
II in which case, the compounds of formula IV are trispiperazides. When Y has one of its other meanings, the compounds are bis-piperazides.

Y can for example represent a substituted or unsubstituted hydrocarbon group which can be of aliphatic, cycloaliphatic or aromatic nature. Examples of suitable aliphatic groups are alkyl, such as methyl, ethyl, propyl, butyl, octyl, dodecyl, or octadecyl; alkenyl, such as allyl; or alkynyl, such as propargyl.

Examples of suitable cycloaliphatic groups are cycloalkyl, such as cyclohexyl, tetrahydronaphthyl or decahydronaphthyl; and cycloalkenyl, such as cyclohexenyl.

Examples of suitable aromatic hydrocarbon groups are aryl groups, such as phenyl, naphthyl, bisphenyl, or phenanthryl; aralkyl, such as benzyl, or phenylethyl; and alkaryl, such as tolyl, dimethylphenyl, trimethylphenyl, cumyl, or p-octylphenyl.

Y can alternatively represent a heterocyclic group, linked to the phosphorus atom through a carbon atom, as in the tetrahydrofurfuryl or 2-pyridyl radicals.

Y can also represent a group of the formula —NHR or —NR$_2$, in which R represents an aliphatic, cycloaliphatic, or aromatic hydrocarbon group or a heterocyclic group. Examples of these hydrocarbon groups or heterocyclic groups are given above. Specific examples of suitable amino radicals are dimethylamino, diethylamino, dipropylamino, dibutylamino, monomethylamino, monoethylamino, monododecylamino, mono-(C$_{10-14}$)alkylamino, monooctadecylamino, anilino, N-methylanilino, p-dodecylanilino, and N-butylanilino.

Alternatively, both symbols R, and the nitrogen atom to which they are attached, can together represent a heterocyclic radical linked to the phosphorus atom through the nitrogen atom. Examples of such groups are morpholino, piperidino, tetrahydroquinolino, or pyrrolidino. The compounds in which Y represents a further piperazino group are, of course, a special instance of this.

Y can also represent a group of the formula —OR in which R has the meaning given above. Examples of such groups are alkoxy, such as methoxy, ethoxy, propoxy, butoxy, dodecyloxy and octadecyloxy; and aryloxy such as phenoxy, tolyloxy, or benzyloxy.

Any of the above radicals can if desired, be substituted. The only limitation upon the nature of the substituents is that they should be inert with respect to epoxy groups.

In the groups of the formula:

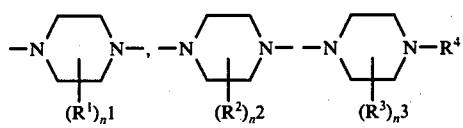

VI  VII  II $R^1$, $R^2$ and $R^3$, which may be the same or different represent substituents on the piperazine ring. Here again, the only limitation upon the nature of the substituents is that they should be inert with respect to epoxy groups. The substituents can, for example, be any of the groups set out above for Y, provided that such a group is inert. When present, they can for example be alkyl groups, such as methyl groups. Alternatively, the substituents can have a meaning not set out above, insofar as it might not be an appropriate group for attachment to phosphorus: for example, an oxo group. Specific examples of substituted piperazine groups are 2,5-dimethylpiperazino and 2,5-dioxopiperazino groups, $n^1$, $n^2$ and $n^3$, which can be the same or different, each represents 0 or an integer, preferably 0, 1 or 2: $R^4$ can represent a hydrogen atom or a substituted or unsubstituted aliphatic, cycloaliphatic or aromatic hydrocarbon group or a heterocyclic group. Examples of suitable groups are set out above. Specifically preferred groups $R^4$ include alkyl, such as methyl, ethyl, phenyl, and substituted groups such as β-cyanoethyl and β-carbethoxyethyl. $R^4$ can also represent an acyl group, e.g. of an aliphatic, cycloaliphatic, aromatic or heterocyclic carboxylic acid, such as acetic, propionic, butyric or stearic acid, cyclohexane carboxylic acid, benzoic acid, toluic acid, nicotinic acid or a methylnicotinic acid.

Alternatively $R^4$ can represent a sulphonyl group, for example a methane sulphonyl, benzene sulphonyl or toluene sulphonyl group.

The compounds of formula V are described in copending application Ser. No. 628,288 filed Nov. 3, 1975 by the instant inventor.

They can readily be prepared by reacting a compound of the formula $X = P (Hal)_3$     or

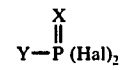

in which X and Y have the meanings given above and Hal represents chlorine or bromine, with a piperazine derivative of the formula

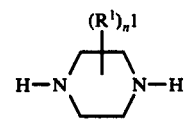

in which $R^1$ and $n$ have the meanings given above. This reaction can conveniently be carried out in an inert solvent, e.g. benzene, toluene or xylene, at an elevated temperature, e.g. 60° to 80° C.

The bis-epoxides are compounds which are known per se. In formulae III and IV, Z represents a direct single bond or a divalent organic radical.

Z can for example represent a group of the formula

—CH$_2$—O—Alk—O—CH$_2$—     VIII in which Alk represents an alkylene group such as ethylene, n-propylene, isopropylene, butylene, pentylene, hexylene or octylene.

Alternatively Z can represent a group of the formula

—CH$_2$—(O Alk)$_m$O—CH$_2$—     IX in which m represents a number and Alk has the meaning given above, and is especially ethylene.

Z can also represent a group of the formula $$-CH_2-O-Ar-O-CH_2- \qquad X$$

in which Ar represents an arylene radical such as o-phenylene, m-phenylene, p-phenylene, 2,4-tolylene, 2,6-tolylene, 1,4-naphthylene, 1,5-naphthylene, 1,8-naphthylene or 9,10-anthracene.

Z can also represent a group of the formula $$-CH_2-O-Ar^1-Q'-Ar^2-O-CH_2-TM \qquad XI$$

in which $Ar^1$ and $Ar^2$, which can be the same or different each represents an arylene radical, and Q' represents a direct chemical bond, an oxygen or sulphur atom, an azo group, a group of the formula >N—R wherein R has the meaning given above, an alkylene group, a sulphoxide or sulphone group, or a phosphonyl group of the formula >P(X)—Y in which X and Y have the meanings given above. Examples of groups of the formula $-O-Ar^1-Q'-Ar^2-O-$ are:

$-O-C_6H_4-O-C_6H_4-O-$;

$-O-C_6H_4-S-C_6H_4-O-$;

$-O-C_6H_4-C_6H_4-O-$;

$-O-C_6H_4-SO-C_6H_4-O-$;

$-O-C_6H_4-SO_2-C_6H_4-O-$;

$-O-C_6H_4-NCH_3-C_6H_4-O-$;

$-O-C_6H_4-CH_2-C_6H_4-O-$;

$-O-C_6H_4-C(CH_3)_2-C_6H_4-O-$;

$-O-C_6H_4-C\phi_2-C_6H_4-O-$ or $-O-C_6H_4-CH\phi-C_6H_4-O-$ in which φ represents phenyl and $C_6H_4$ represents o-, m- or p-phenylene, preferably p-phenylene.

Alternatively, Z can represent a group of the formula $$-CH_2-O-CO-M-CO-O-CH_2- \qquad XII$$

wherein M represents an organic group. The polymers can then be regarded as being derived from organic dicarboxylic acids.

In formula XII, M represents a substituted or unsubstituted aliphatic, cycloaliphatic, or aromatic radical, or a heterocyclic radical. Suitable aliphatic radicals are alkylene radicals, such as polymethylene radicals; alkylidene radicals, such as ethylidene or isopropylidene radicals; alkenylene radicals, such as —CH=CH—; and alkynylene radicals, such as —C≡C—. Examples of acids in which M represents a methylene or polymethylene chain include malonic, succinic, glutaric, adipic, pimelic and sebacic acids. Acids in which M is alkylidene are monomethylmalonic dimethylmalonic and α-methylsuccinic acid. Acids in which M is alkylene include maleic and fumaric acids. Acids in which M is alkynylene include acetylene dicarboxylic acid.

Suitable cycloaliphatic acids are saturated or unsaturated acids, such as cyclohexane-1,2-dicarboxylic acid and cyclohexene-1,2-dicarboxylic acid.

Suitable aromatic acids are those in which M represents an o-, m- or p-phenylene group, a naphthylene group or a biphenylene group; e.g. phthalic acid, isophthalic acid, terephthalic acid, naphthylene-1,8-dicarboxylic acid or biphenyl-4,4'-dicarboxylic acid.

Another group of acids that can be employed have the general formula $$HOOC-Ar^1-Q'-Ar^2-COOH \qquad XIII$$

in which $Ar^1$, $Ar^2$ and Q' have the meanings given above. Examples of such acids are diphenyl ether-4,4'-dicarboxylic acid, diphenyl sulphide-4,4'-dicarboxylic acid, diphenyl sulphoxide-4,4'-dicarboxylic acid, diphenyl sulphone-4,4'-dicarboxylic acid, triphenylphosphine oxide-4,4'-dicarboxylic acid, diphenyl methylamine-4,4'-dicarboxylic acid, diphenyl dimethylsilane-4,4'-dicarboxylic acid, diphenyl methane-4,4'-dicarboxylic acid, and 2,2-diphenylpropane-4,4'-dicarboxylic acid.

Another group of radicals Z has the formula $$-CH_2O-\overset{X}{\underset{Y}{\overset{\|}{P}}}-OCH_2- \text{ or } -CH_2O-\overset{X}{\underset{Y}{\overset{\|}{P}}}-M-\overset{X}{\underset{Y}{\overset{\|}{P}}}-OCH_2-$$
$$\text{XIV} \qquad\qquad\qquad \text{XV}$$

in which X, Y and M have the meanings given above. Examples of such acids include monophenyl phosphate, monoethyl phosphate, monophenyl phosphite and N'-methyl monophenyl (phosphoamidate).

Yet another group of radicals Z is constituted by the sulphur-containing acid radicals. $-CH_2O.SO_2.OCH_2-$, $-CH_2O.SO.OCH_2-$, $-CH_2O.SO_2.M.SO_2.OCH_2-$, $-CH_2O.SO.M.SO.OCH_2-$, $-CH_2O.SO_2.M.SO.OCH_2-$, $$-CH_2-\overset{X}{\underset{Y}{\overset{\|}{P}}}-M-O-SO_2-O-CH_2-$$

or $-CH_2-O-SO_2-O-M-CO-O-CH_2-$ i.e. radicals of sulphuric acid, sulphurous acid, hydrocarbon disulphonic acids (e.g. butane-1,4-disulphonic acid, or benzene disulphonic acid), hydrocarbon disulphinic acids and hydrocarbon monosulphonic monosulphinic acids, hydrocarbon monosulphonic monophosphonic acids or hydrocarbon monosulphonic monocarboxylic acids.

The bis-epoxides can be prepared in various known ways. The compounds of formula IV can, for instance, be prepared by epoxidation of compounds of the formula $$CH_2=CH-Z-CH=CH_2 \qquad XVI$$

The epoxidation reaction can generally be carried out in known manner, e.g. by reaction with peroxycarboxylic acids, such as perbenzoic acid.

Alternatively, epichlorohydrin can be reacted at elevated temperature (e.g. 110° C.) with a dihydroxy compound of the formula HO—Alk—OH to form the corresponding ether of the formula

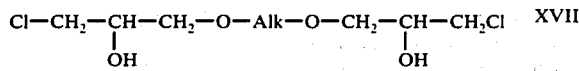

which is then converted in alkaline solution (e.g. at pH 10 and 90° C.) into the required bisglycidyl ether.

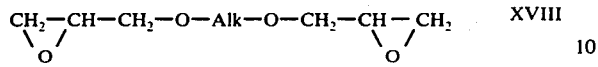

Corresponding reactions can also be carried out on dihydroxy compounds of the formulae

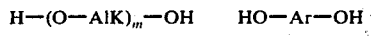

It is, moreover, possible to form glycidyl esters of acids of the formula

HO—CO—M—CO—OH            XXII or of the sulphur-containing and phosphorus-containing acids mentioned above.

Other bis-epoxides which can be used in the production of the polymers of the present invention are vinylcyclohexane dioxide; dicyclopentadiene dioxide; the diepoxy ester of the formula

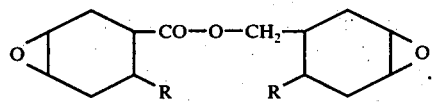

in which R represents hydrogen or methyl; and the diepoxide obtained from the product of reaction of tetrahydrobenzaldehyde, the condensation product of butadiene and acrolein having for example the formula

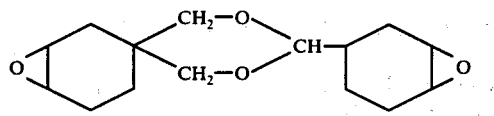

or

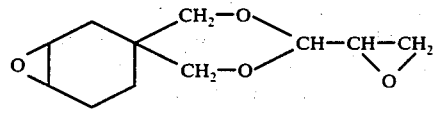

Other epoxides are described in Kirk-Othmer Encyclopedia of Chemical Technology (2nd Edn.) Vol. 8, pp. 294–312.

In general, the groups R⁵ in the compounds of formula III

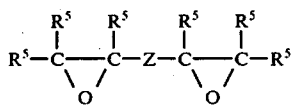

are preferably unsubstituted, but they may have substituents which are inert with respect to the epoxy rings. Substituents which would attack an epoxy ring, e.g. hydroxy, sulphydryl, primary or secondary amino, labile halogen, or acidic groups, such as carboxylic, sulphonic or phosphonic acid groups, should not be present on the substituents $R^5$.

The polymers according to the invention are, as stated above, produced by reacting a bis-epoxide with a diamine of the formula

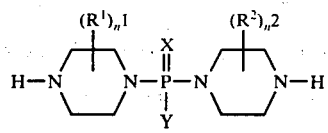

In order to provide high molecular weights, the diamine of formula V and the bisepoxide should be reacted in a strictly stoichiometric ratio as amino group : epoxy group of 1:1. If mixtures of two or more diamines (of which at least one must have formula V) are reacted in stoichiometric proportions with one or more bisepoxides, it is possible to prepare copolymers containing phosphorus in the main chain. To avoid side reactions of pendant hydroxyl groups of the reaction product with epoxy groups or cross linking reactions, the polyaddition has to be carried out under mild conditions. Therefore, the use of a catalyst is recommended in order to decrease the reaction temperature and to increase the reaction rate. Suitable catalysts are hydroxylic compounds such as alcohols and phenols. The reaction can be carried out easily in ethanol, which acts both as a catalyst and as a solvent.

The non cross-linked polymers have good solubility in common organic solvents, such as alcohol, dioxane, morpholine, chloroform, dichloromethane, pyridine and dimethyl formamide.

The polymers according to the invention can be formed into shaped articles, e.g. films or filaments. Because of their phosphorus content, such articles would be non-flammable or flame-retardant.

Transparent, colourless films can be cast from concentrated polymer solutions in chloroform. Such films show very good adhesion towards glass and metal surfaces, and are flame-retardant or self-extinguishing, due to the phosphorus content of about 5 percent. In Table 1 the approximate melting range of some polymers is indicated. Some other polymers seem to be cured without melting.

The thermal stability of the polymer XXVI (see below) with Y=—O—C₆H₅ was determined by heating well-dried film strips at 200° C. in air. A weight loss of about 25% took place in the first 15 minutes, then the weight remained constant for 50 hours, whereafter it decreased slowly over the next 50 hours.

Films of polymers according to the invention are stable under alkaline conditions but are attacked by acids. For instance, a film was not decomposed by immersion for 40 days in 0.1 N potassium hydroxide, but was completely decomposed in 2 to 3 hours when immersed in 0.1 N sulphuric acid. Quantitative studies on the decomposition of a polymer by formic acid showed random scission of the polymer chain.

The polymers become insoluble on standing as a result of cross-linking, brought about by the action of light and by a side-reaction of residual epoxy groups with hydroxyl groups. Blocking of the residual epoxy groups with piperidine greatly increases the gel-time; whilst polymers do not lose their stability on standing if the epoxy groups are blocked by reaction with piperidine and the hydroxy groups are blocked by reaction with an isocyanate, such as phenyl isocyanate.

Both the non-treated and the treated polymers form stable solutions in dimethyl formamide. They remain in solution on exposure to daylight, or after heating for 600 hours at 75° C, in which latter case there was some reduction in the reduced viscosity of the solution.

Pratice of the invention will be apparent to those skilled in the art from inspection of the following examples which illustrate various aspects of specific embodiments.

ble fraction (gel) indicating that in the latter fraction cross linking has occurred to some extent.

Sometimes (e.g. when Y = —O—$C_6H_5$) the reaction mixture separates into two layers, because the polymer has small solubility in ethanol, but this can be avoided by the use of solvent mixtures e.g. ethanol : dimethyl formamide.

Several polymers with the general formula XXVI prepared in this way are described in Table 1.

Table 1.

Polymers prepared with the general formula XXVI $$\left[-N\underset{\diagdown}{\diagup}N-\underset{\underset{Y}{|}}{\overset{\overset{O}{\|}}{P}}-N\underset{\diagdown}{\diagup}N-CH_2-\underset{\underset{OH}{|}}{CH}-CH_2-O-\underset{\diagdown}{\diagup}-O-CH_2-\underset{\underset{OH}{|}}{CH}-CH_2-\right]_x$$

| Polymer | % Yield | Intrinsic viscosity in $CHCl_3$ at 25° C. | melting range[c] |
|---|---|---|---|
| Y = —O—$C_6H_5$ | 100 | 0.80 dl/g | no melting |
| = —O—$C_6H_5$[a] | 100 | 0.30 dl/g | no melting |
| = —O—$C_2H_5$ | ~100 | 0.16 dl/g | 118–135° C. |
| = —N◯O | ~100 | 0.20 dl/g | 155–180° C. |
| = —N($nC_3H_7$)$_2$ | 81 | 0.13 dl/g | 118–135° C. |
| = —NH—$C_6H_5$ | 33 rest is gel | 0.10 dl/g[b] | 125–160° C. |
| = —NH—($nC_{18}H_{37}$) | 90.5 | 0.14 dl/g | 90–105° C. |

[a]Solvent EtOH : DMF (1:1 by volume)
[b]measured in DMF at 25° C.
[c]the melting range was determined in a melting point capillary; temperature increase 8°/minute.

DESCRIPTION OF SPECIFIC EMBODIMENTS

EXAMPLE 1

The following general procedure can be used for the polyaddition reaction

A 0.1 molar ethanolic solution (50 ml) containing equivalent quantities of a diamine of formula V (0.010 mole) and hydroquinone bisglycidyl ether (0.010 mole) was heated for 5 hours at 75°–76° C. The solvent ethanol was then stripped off under reduced pressure at 40°–50° C: the residue was dissolved in 60 ml of chloroform and the polymer was precipitated by pouring this mixture dropwise into 800 ml of n-hexane; followed by filtering and drying. In general, the polymer was obtained in excellent yields and in some instances the reaction product comprises both a soluble and a partly solu-

EXAMPLE 2

Under the conditions set out in Example 1, a copolymer was prepared from hydroquinone bisglycidyl ether (HQBGE) and a 1:1 molar mixture of ethyl bispiperazido phosphate (XXVII) and phosphoric dipropylamide bispiperazide (XXVIII).

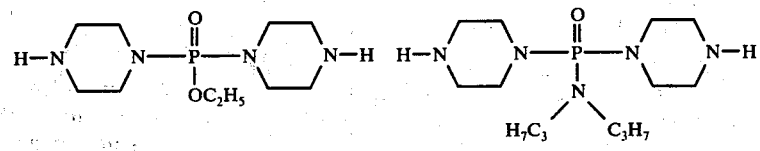

XXVII                    XXVIII

Fractionation, followed by analysis of the fractions, indicated that the product was a true copolymer and not a mixture of homopolymers. The fractions had intrinsic viscosities of 0.10 – 0.29 dl/g, measured at 25° C. in chloroform.

EXAMPLE 3

Under the conditions set out in Example 1, a polymer was prepared from HQBGE and phenyl bispiperazido thiophosphate. The product having the general formula

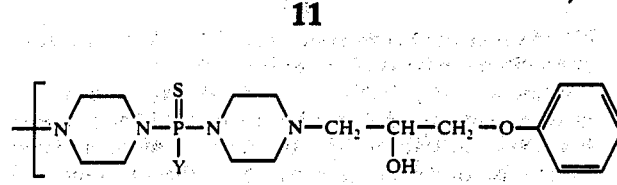

XXIX in which Y = O C$_6$H$_5$ comprised 20% of an insoluble gel and 80% of a soluble fraction having an intrinsic viscosity (measured at 25° C. in chloroform) of 0.28 dl/g.

Other polymers of general formula XXIX in which Y respectively represented:
(a) ethoxy, (b) di-n-butylamino, (c) piperazino, (d) n-octadecyloxy, and (e) N-n-butylanilino, were also prepared.

EXAMPLE 4

Under the conditions set out in Example 1, polymers of the following general formula

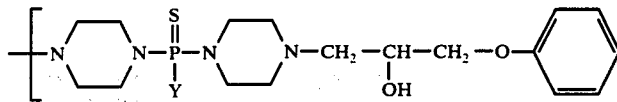

XXX were prepared in which Y respectively represented:
(a) p-n-dodecyl-anilino, (b) n-C$_{10-14}$-alkylamino, (c) n-octadecyloxy, (d) piperazino, and (e) N-n-butylanilino.

Although this invention has been illustrated by reference to specific embodiments, it will be apparent to those skilled in the art that various changes and modifications may be made which fall within the scope of this invention.

What we claim is:

1. Polymers containing units of the formula

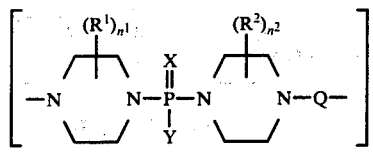

wherein
X represents an oxygen or sulphur atom, or a group of the formula >N—R in which R represents an aliphatic, cycloaliphatic or aromatic hydrocarbon group or a heterocyclic group, or X may be absent;
Y represents an aliphatic, cycloaliphatic or aromatic hydrocarbon group, or a heterocyclic group;
a group of the formula —NHR or —NR$_2$ in which R has the meaning given above, or in which the two groups R and the nitrogen atom to which they are attached represent a N-containing heterocyclic group;
a group of the formula —OR in which R has the meaning given above; or
a group of the formula

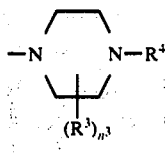

R$^1$, R$^2$, R$^3$ and R$^4$ each represents a hydrocarbon substituent on a piperazine ring;
n$^1$, n$^2$ and n$^3$ each represents zero or an integer; and
Q represents the residue of a symmetrical or unsymmetrical bis-epoxide.

2. A polymer as claimed in claim 1 in which Y represents a group of the formula

—OR, —NMR or —NR$_2$ wherein R represents alkyl or aryl of the group —NR$_2$ represents an N-containing heterocyclic group.

3. A polymer as claimed in claim 1, wherein n$^1$ and n$^2$ both represent zero.

4. A polymer as claimed in claim 1, wherein Q represents a group of the partial formula

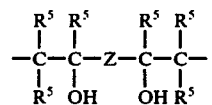

in which Z represents a direct single bond or an organic radical, and the various symbols R$^5$, which can have the same or different meanings, each represents hydrogen or a substituted or unsubstituted aliphatic, cycloaliphatic or aromatic hydrocarbon group, or two groups R$^5$, not attached to the same carbon atoms, can together with the respective carbon atoms to which they are attached, represent a substituted or unsubstituted cycloaliphatic hydrocarbon group, any substituents on the groups R$^5$ being inert with respect to epoxy groups.

5. A polymer as claimed in claim 4, wherein Q represents a group of the formula

—CH$_2$—CH—Z—CH—CH$_2$—
  |     |
  OH   OH in which Z represents a direct single bond or an organic radical.

6. A polymer as claimed in claim 4 wherein Z represents a group of the formula $$-CH_2-O-Alk-O-CH_2- \quad \text{or}$$

$$-CH_2-(O-Alk)_m-O-CH_2-$$

in which Alk represents an alkylene hydrocarbon group and m represents a number.

7. A polymer as claimed in claim 4 wherein Z represents a group of the formula $$-CH_2-O-Ar-O-CH_2-$$

in which Ar represents an arylene hydrocarbon radical.

8. A polymer as claimed in claim 4 wherein Z represents a group of the formula $$-CH_2-O-Ar^1-Q'-Ar^2-O-CH_2-$$

in which $Ar^1$ and $Ar^2$, which can be the same or different, each represents an arylene hydrocarbon radical, and Q' represents a direct chemical bond, an oxygen or sulphur atom, an azo group, a group of the formula >N—R in which R represents an aliphatic, cycloaliphatic or aromatic hydrocarbon group or heterocyclic group, an alkylene hydrocarbon group, a sulphoxide group, a sulphone group or a phosphonyl group of the formula >P(X)—Y
wherein
X represents an oxygen or sulphur atom, or a group of the formula >N—R in which R represents an aliphatic, cycloaliphatic or aromatic hydrocarbon group or a heterocyclic group, or X may be absent;
Y represents an aliphatic, cycloaliphatic or aromatic hydrocarbon group, or a heterocyclic group;
a group of the formula —NHR or —NR$_2$ in which R has the meaning given above, or in which the two groups R and the nitrogen atom to which they are attached represent a N-containing heterocyclic group;
a group of the formula —OR in which R has the meaning given above; or
a group of the formula

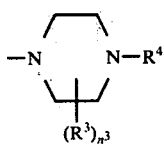

$R^1$, $R^2$, $R^3$ and $R^4$ each represents a hydrocarbon substituent on a piperazine ring.

9. A polymer as claimed in claim 2 wherein Z represents a group of the formula $$-CH_2-O-CO-M-CO-O-CH_2-$$

in which M represents an organic hydrocarbon group, or a radical of a sulphur-containing or phosphorus-containing acid.

10. A process for the production of polymers which comprises reacting a bis-epoxide with a diamine of the formula

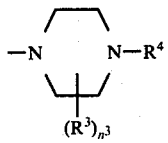

wherein
X represents an oxygen or sulphur atom, or a group of the formula >N—R in which R represents an aliphatic, cycloaliphatic or aromatic hydrocarbon group or a heterocyclic group, or it may be absent;
Y represents an aliphatic, cycloaliphatic or aromatic hydrocarbon group, or a heterocyclic group; a group of the formula —NHR or —NR$_2$ in which R has the meaning given above, or in which the two groups R and the nitrogen atom to which they are attached represent a N-containing heterocyclic group; a group of the formula —OR in which R has the meaning given above; or a group of the formula

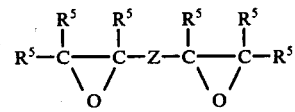

$R^1$, $R^2$, $R^3$ and $R^4$ each represents a hydrocarbon substituent on a piperazine ring; $n^1$, $n^2$ and $n^3$ each represents zero or an integer.

11. A process as claimed in claim 10, wherein the bis-epoxide has the formula

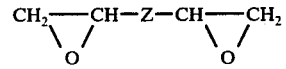

in which each $R^5$ is independently hydrogen or a substituted or unsubstituted aliphatic, cycloaliphatic, or aromatic hydrocarbon group, or two groups $R^5$, not attached to the same carbon atom, can together with the respective carbon atoms to which they are attached, represent a substituted or unsubstituted cycloaliphatic group, any substituents of the groups $R^5$ being inert with respect to epoxy groups and Z represents a direct single bond or an organic radical.

12. A process as claimed in claim 11, wherein the bis-epoxide has the formula

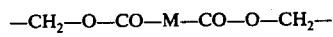

in which Z represents a direct single bond or an organic radical.

13. A process as claimed in claim 10, wherein the bis-epoxide is hydroquinone bisglycidyl ether.

14. A process as claimed in claim 10, wherein a mixture of bis-epoxides is employed.

15. A process as claimed in claim 10, wherein the diamine is a mixture of diamines.

16. A process as claimed in claim 10, wherein reaction is catalyzed by a hydroxylic compound.

17. A process as claimed in claim 16, wherein reaction is carried out in solution in an alcohol.

* * * * *

UNITED STATES PATENT AND TRADEMARK OFFICE
CERTIFICATE OF CORRECTION

PATENT NO. : 4,072,633
DATED : February 7, 1978
INVENTOR(S) : JOHNY HERMANS

It is certified that error appears in the above-identified patent and that said Letters Patent are hereby corrected as shown below:

Claim 2, line 4     "of" should be --or--

Claim 9, line 1     "2" should be --4--

Column 2, line 64   "W" should be --V--.

Signed and Sealed this

Twenty-third Day of May 1978

[SEAL]

Attest:

RUTH C. MASON
Attesting Officer

LUTRELLE F. PARKER
Acting Commissioner of Patents and Trademarks